(12) United States Patent
Fireaizen et al.

(10) Patent No.: US 9,143,220 B2
(45) Date of Patent: Sep. 22, 2015

(54) DIGITAL RETRO-DIRECTIVE COMMUNICATION SYSTEM AND METHOD THEREOF

(71) Applicant: Elta Systems Ltd., Ashod (IL)

(72) Inventors: Moshe Fireaizen, Halamish (IL); Ofer Shariv, Rishon Lezion (IL)

(73) Assignee: ELTA SYSTEMS LTD., Ashod (IL)

( * ) Notice: Subject to any disclaimer, the term of this patent is extended or adjusted under 35 U.S.C. 154(b) by 0 days.

(21) Appl. No.: 14/574,694

(22) Filed: Dec. 18, 2014

(65) Prior Publication Data

US 2015/0155927 A1    Jun. 4, 2015

Related U.S. Application Data

(63) Continuation of application No. 13/141,928, filed as application No. PCT/IL2009/001166 on Dec. 9, 2009, now Pat. No. 8,948,277.

(30) Foreign Application Priority Data

Dec. 23, 2008  (IL) .......................................... 196146

(51) Int. Cl.
    *H04B 7/06*   (2006.01)
    *H01Q 3/26*   (2006.01)
(52) U.S. Cl.
    CPC .............. *H04B 7/068* (2013.01); *H01Q 3/2647* (2013.01); *H04B 7/0667* (2013.01)
(58) Field of Classification Search
    CPC ............................... H01Q 3/2647; H04B 7/068

USPC ......................................................... 375/267
See application file for complete search history.

(56) References Cited

U.S. PATENT DOCUMENTS 2,908,002 A   10/1959  Van Atta
3,833,893 A    9/1974  Rajchman (Continued)

FOREIGN PATENT DOCUMENTS

WO      WO 02/05436       1/2002

OTHER PUBLICATIONS

Loadman C et al: "A retrodirective array using direct down-conversion and fixed point DSP for duplex digital communications" Radio and Wireless Symposium, 2006 IEEE San Diego, CA, USA 2006, Piscataway, NJ, USA, IEEE, Jan. 1, 2006, pp. 335-338, XP010906537 ISBN: 978-0-7803-9412-4 p. 335, paragraph 1—p. 337, paragraph 3; figures 1,2.

(Continued)

*Primary Examiner* — Michael Neff
(74) *Attorney, Agent, or Firm* — Frommer Lawrence & Haug LLP; William S. Frommer

(57) ABSTRACT

The present invention relates to a digital retro-directive system and method thereof for receiving incoming signals from a transmitting source by means of at least two antennas and transmitting outgoing signals back, substantially, simultaneously, towards said transmitting source through said at least two antennas irrespective of the location of one antenna with respect to another and without calculating phase differences between said outgoing signals.

22 Claims, 8 Drawing Sheets

(56) References Cited

U.S. PATENT DOCUMENTS

| | | |
|---|---|---|
| 4,080,660 A | 3/1978 | Constant |
| 4,131,791 A | 12/1978 | Lego, Jr. |
| 4,383,332 A | 5/1983 | Glance et al. |
| 4,762,397 A | 8/1988 | Pepper |
| 5,254,997 A | 10/1993 | Cohn |
| 5,909,299 A | 6/1999 | Sheldon, Jr. et al. |
| 6,211,815 B1 | 4/2001 | Richey et al. |
| 6,630,905 B1 | 10/2003 | Newberg et al. |
| 7,081,850 B2 | 7/2006 | Small |
| 7,089,796 B2 | 8/2006 | Pepper et al. |
| 2004/0209554 A1 | 10/2004 | Tsumagari et al. |
| 2005/0041746 A1* | 2/2005 | Rosen et al. ............... 375/242 |
| 2006/0084365 A1 | 4/2006 | Sakurai et al. |
| 2006/0098746 A1 | 5/2006 | Candy et al. |
| 2007/0180778 A1 | 8/2007 | Prasad |
| 2008/0090498 A1 | 4/2008 | Misra et al. |
| 2008/0266152 A1 | 10/2008 | Durtschi |

OTHER PUBLICATIONS

Gomes J et al: "Time-reversed OFDM communication in underwater channels" Signal Processing Advances in Wireless Communications, 2004 IEEE $5^{th}$ Workshop on Lisbon, Portugal Jul. 11-14, 2004, Piscataway, NJ, USA, IEEE LINKD-DOI:10.1109/SPAWC.2004. 1439321, Jul. 11, 2004, pp. 626-630, XP010805978 ISBN: 978-0-7803-8337-1.

Gomes J et al: "Wavefront segmentation in phase-conjugate arrays for spatially modulated acoustic communication" Oceans, 2001. MTS/IEEE Conference and Exhibition Nov. 5-8, 2001, Piscataway, NJ, USA, IEEE, vol. 4, Nov. 5, 2001, pp. 2236-2243, XP010566783 ISBN: 978-0-933957-28-2.

Didomenico L D et al: "Digital Communications Using Self-Phased Arrays" IEEE Transactions on Microwave Theory and Techniques, IEEE Service Center, Piscataway, NJ, US, vol. 49, No. 4, Part 01, Apr. 1, 2001, pp. 677-684, XP001093384 ISSN: 0018-9480.

\* cited by examiner

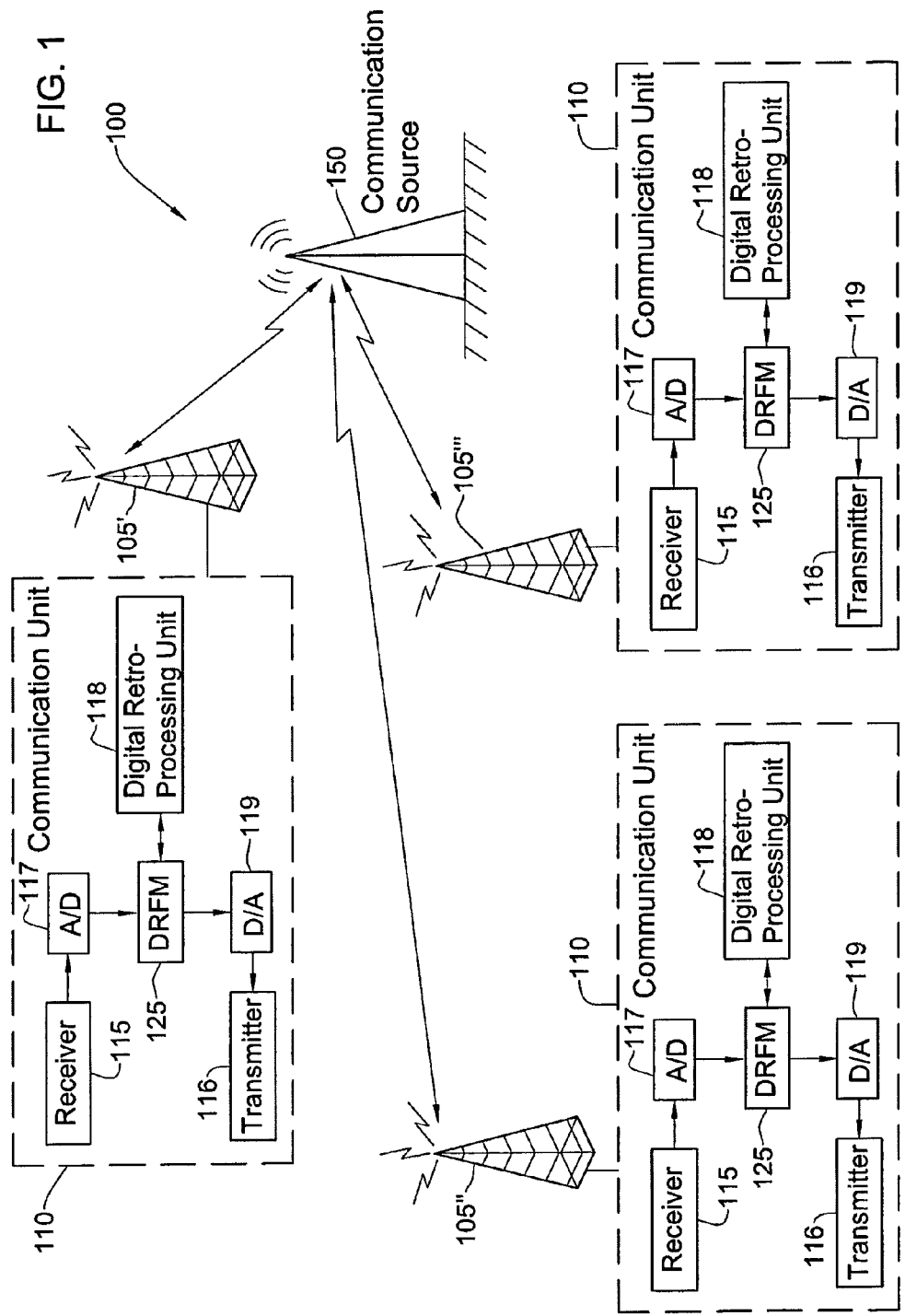

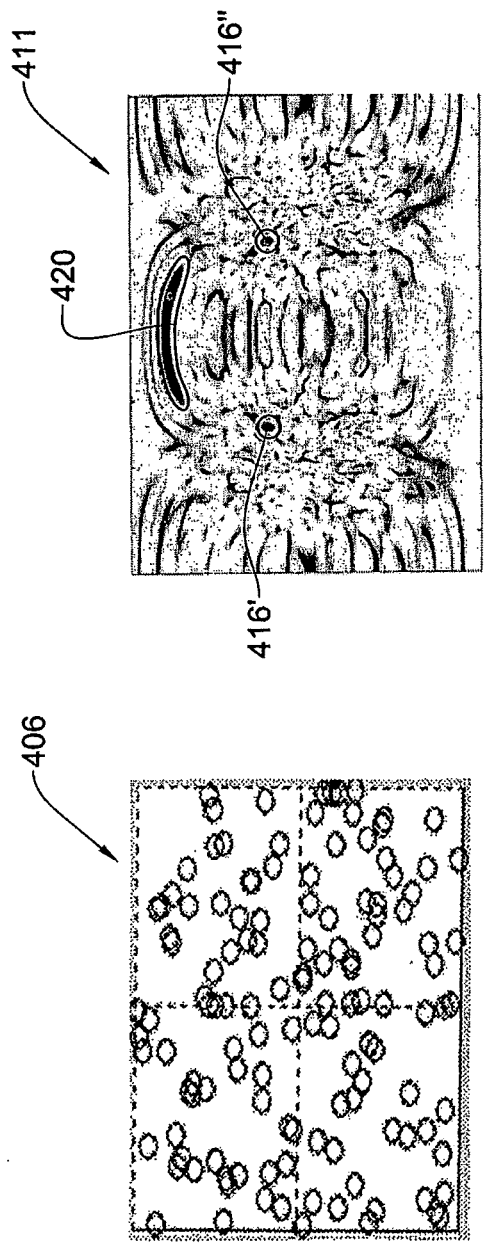

DIGITAL RETRO-DIRECTIVE COMMUNICATION SYSTEM AND METHOD THEREOF

This is a continuation of application Ser. No. 13/141,928, filed Jun. 23, 2011, which is a 371 of International Application serial number PCT/IL2009/001166, filed Dec. 9, 2009, which is entitled to the priority filing date of Israeli application(s) 196146, filed on Dec. 23, 2008, the entirety of which is incorporated herein by reference.

FIELD OF THE INVENTION

The present invention relates to the communication field. More particularly, the present invention relates to a digital retro-directive method and system configured to receive signals, such as RF (Radio Frequency), acoustic or seismic signals from one or more transmitting sources, and transmit said signals back towards said transmitting sources from a plurality of antennas in a substantially simultaneous (synchronous) manner and in a substantially precise angular direction, without the need to measure such direction.

DEFINITIONS, ACRONYMS AND ABBREVIATIONS

Throughout this specification, the following definitions are employed:

Carrier: in telecommunications, carrier or a carrier wave is a waveform that is modulated with a data signal for the purpose of conveying information to be transmitted.

Corner Reflector: a corner reflector is a retro-reflector that usually consists of three mutually perpendicular, intersecting flat surfaces, which reflect electromagnetic waves back towards the source. The three intersecting surfaces may have, for example, square shapes. A directional antenna using two mutually intersecting conducting flat surfaces can be also considered to be a type of corner reflector.

Heterodyning: is a generation of new frequencies by mixing, or multiplying, two oscillating waveforms. It is useful for modulation and demodulation of signals, or placing information of interest into a useful frequency range.

Interference: is the superposition of two or more waves that results in a new wave pattern.

Phased Array: is a group of antennas, in which the relative phases of the respective signals feeding the antennas are varied in such a way that the effective radiation pattern of the array is reinforced in a desired direction and suppressed in undesired directions.

Signal Sample: is a value of one or more characteristics of a signal at a chosen time instant.

BACKGROUND OF THE INVENTION

The need to transmit signals (e.g., RF, acoustic or seismic signals) back towards a transmitting source (such as a wireless or RF device/system, a satellite device/system, an acoustic device/system, a seismic device/system and the like) in a precise manner arises in many communication systems and applications. When knowing where exactly the transmitting source is located, it can be assured that the transmitted signal reaches said source. This issue can be especially important, when communicating with distant sources, such as satellites, and/or when the accuracy in transmitting the signal in a precise direction is important.

The problem of transmitting RF signals back towards the transmitting source has been recognized in the prior art, and various systems have been developed to provide a solution, disclosing various time-reversal and phase-conjugation techniques. For example, a prior art method called "heterodyning" or "heterodyne mixing" is a phase conjugation method, according to which a signal received at each antenna is multiplied by means of a local oscillator, having a frequency which is two times of the frequency of the received signal; the signal is then filtered via low pass filter (LPF). The method may handle both far as well as near-field targets, and can be implemented in various antenna array geometries. Heterodyne mixing is a narrowband method that may handle only signals of known frequencies; otherwise, it requires frequency estimation of the received signals. Furthermore, the heterodyne mixing method cannot handle simultaneous signals.

In addition, there are several prior art systems, such as phased arrays. For using such arrays, determining an angular direction of the transmitting source is required, as well as also calculating the phase differences of the signal to be transmitted towards the source from each antenna of said phased array. It should be noted that calculating the signal phase differences requires relatively complex processing, and also the usage of a phase shifter is required. In addition, the accuracy in calculating the phase differences of the signal depends on how accurately an angular direction of the source is determined.

Often, prior to being received by means of antennas, a RF signal is reflected from several accidental reflectors, such as tower blocks, balconies and the like. Thus, measurements of the source angular direction depend on such accidental factors, which in turn lead to receiving incorrect results. Further, for improving the measurements when operating at relatively high frequencies, e.g., above 2 GHz (GigaHertz), the antennas have to be positioned relatively close to one another, which may cause juxtaposition of antennas within said phased array (especially, when receiving RF signals), and can also cause antennas to overheat during RF signals transmission. Moreover, this can result in disturbances in calculating phase differences of the signal to be transmitted from each antenna. Usually, the antennas within the phased array have to be positioned on a straight plane in order to be able to further determine and calculate the required angular direction of the signal to be transmitted by means of each antenna (in order to get the greatest overall ERP (Effective Radiated Power) in the direction to which the RF signal is transmitted).

For example, U.S. Pat. No. 4,383,332 relates to a mobile radio base station capable of communicating with a large number of mobile stations by implementing space diversity and time-division retransmission techniques in a digital communication system. The digital base station contains a plurality of antenna elements and a plurality of retransmission branches associated in a one-to-one relationship. When the base station transmits a signal back to the mobile station, each retransmission branch adds the conjugate of its associated random phase to the signal to be transmitted, allowing the environment to "undo" the effect of the conjugate random phase so that the signals transmitted by the plurality of antenna elements will arrive coherently at the mobile station. According to U.S. Pat. No. 4,383,332, the retro-directivity is achieved by analog implementation of the phase conjugation for transmitting narrowband signals with known frequencies, each narrowband signal at the same time.

Further, U.S. Pat. No. 6,630,905 discloses a system and method for automatically generating a return beam in the direction of a received beam. The system includes a phased array antenna for receiving a radio frequency signal having a first wavefront from a first direction. In response to this signal, the second signal is provided having a second wavefront. The second signal is a phase conjugate of the first signal and is transmitted in a reverse direction relative to the direction of the first signal.

Also, according to the prior art, a corner reflector can be used for reflecting electromagnetic waves back towards the transmitting source. The RF wave hits the surface of the corner reflector, and due to its unique structure, the wave is reflected back towards the source. The corner reflector can be used for communication applications, where signals have to be immediately reflected back to the source. For example, by placing such a reflector on the Moon, this can help measure the Moon's orbit in a more accurate manner. According to U.S. Pat. No. 5,909,299, a detailed mapping of the magnetosphere is made possible by deploying hundreds of attitude-impervious micro-satellites, in the form of small corner reflectors with piezoelectric mirror surfaces, from a single mother satellite at spacings of as little as 1 km in equatorial and elliptical orbits. The micro-satellites carry magneto-sensors whose output is transmitted to a ground station by modulating the reflection of a laser beam transmitted to the micro-satellite by the ground station. U.S. Pat. No. 5,909,299 relates to transmitting narrowband signals of a known frequency, each narrowband signal at the same time.

In addition, the prior art teaches about a Van Atta reflector array (U.S. Pat. No. 2,908,002) that is an array, in which elements are interconnected to reradiate received energy back in the direction of arrival. The Van Atta reflector array requires ULA (Uniform Linear Array) geometry and can handle signals received from far sources to ensure planar wavefronts.

There is a continues need in the prior art to provide a digital retro-directive method and system configured to enable transmitting a signal from a plurality of antennas towards a transmitting source in a substantially simultaneous (synchronous) manner and in a substantially precise angular direction, without the need to measure such direction.

Also, there is a need to provide a retro-directive method and system that enables simultaneous transmitting of signals from each antenna back towards a transmitting source without calculating signals phase differences, and further enables transmitting signals having unknown frequencies. In addition, there is a need o provide a retro-directive method and system, wherein there is no need in positioning antennas on a straight plane for enabling said simultaneous transmitting.

Moreover, there is a need to provide a retro-directive method being applicable for both narrow and wideband communication systems, further enabling simultaneous multi-signal communication with multiple far-distanced and/or near-field transmitting sources.

SUMMARY OF THE INVENTION

The present invention relates to a digital retro-directive method and system configured to receive signals (such as RF signals, electromagnetic signals, acoustic, seismic signals, or photonic signals, etc.) from one or more transmitting sources (such as a wireless or RF device/system, a satellite device/system, an acoustic device/system, a seismic device/system, a photonic device/system, and the like), and transmit signals back towards said transmitting sources from a plurality of antennas (e.g., antenna elements) in a substantially synchronous manner and in a substantially precise angular direction, without the need to measure such direction.

A system is configured to transmit a signal back, substantially simultaneously, towards a transmitting source, the system comprising:

a) at least two antennas; and
b) at least two communication units, each of which is connected to its corresponding antenna, said each communication unit comprising:
b.1. a receiver for receiving a signal from a transmitting source;
b.2. an Analog-to-Digital (A/D) unit for sampling the received signal for a predefined period of time, giving rise to signal samples;
b.3. a digital memory unit for storing the signal samples of said received signal in its memory in a given sampling order, on a time scale;
b.4. a processing unit for reconstructing a signal, including:
b.4.1. deciding about at least one sub-group of signal samples that are sampled within said predefined period of time;
b.4.2. inverting said sampling order of said signal samples within said at least one sub-group; and
b.4.3. reconstructing said signal by using said signal samples, which have the inverted sampling order, as data carriers, giving rise to a reconstructed digital signal;
b.5. a Digital-to-Analog (D/A) unit for converting said reconstructed digital signal to a reconstructed analog signal to be transmitted; and
b.6. a transmitter for transmitting said reconstructed analog signal back towards said transmitting source substantially simultaneously from each of said at least two antennas.

According to an embodiment of the present invention, the signal is one or more of the following:
a) a Radio Frequency (RF) signal;
b) an electromagnetic (EM) signal;
c) an acoustic signal;
d) a seismic signal; and
e) a photonic signal.

According to another embodiment of the present invention, the digital memory unit is a Digital Radio Frequency Memory (DRFM) unit.

According to still another embodiment of the present invention, the reconstructed digital signal is transmitted back towards transmitting source by means of, for example, two or more antennas with a delay (e.g., a second, a minute, an hour, and the like).

According to still another embodiment of the present invention, the reconstructed digital signal is modulated by means of a modulation unit.

According to a particular embodiment of the present invention, the processing unit is incorporated within the transmitter.

According to another embodiment of the present invention, a system is configured to transmit a signal back, substantially simultaneously, towards a transmitting source, the system comprising:
a) at least two antennas; and
b) at least two communication units, each of which is connected to its corresponding antenna, said each communication unit comprising:
b.1. a receiver for receiving a signal from a transmitting source;
b.2. an A/D unit for sampling the received signal for a predefined period of time, giving rise to signal samples, each of which has an amplitude and phase;
b.3. a digital memory unit for storing the signal samples of said received signal in its memory in a given sampling order, on a time scale;

b.4. a processing unit for reconstructing a signal, including:
- b.4.1. deciding about at least one sub-group of signal samples that are sampled within said predefined period of time;
- b.4.2 performing phase conjugation of each signal sample within said at least one sub-group, giving rise to phase conjugated signal samples; and
- b.4.3. reconstructing said signal by using said phase conjugated signal samples as data carriers, giving rise to a reconstructed digital signal;

b.5. a D/A unit for converting said reconstructed digital signal to a reconstructed analog signal to be transmitted; and b.6. a transmitter for transmitting said reconstructed analog signal back towards said transmitting source substantially simultaneously from each of said at least two antennas.

According to still another embodiment of the present invention, the phase conjugation of the signal samples is performed by multiplying said signal samples by a corresponding function and/or by applying Fast Fourier Transform (FFT) on said signal samples.

According to a further embodiment of the present invention, a system is configured to transmit a signal back, substantially simultaneously, towards a transmitting source, the system comprising:

a) a corner reflector; and b) at least two antennas connected to said corner reflector, each of said at least two antennas further connected to its corresponding communication unit that comprises:
- b.1. a receiver for receiving a signal from a transmitting source;
- b.2. an A/D unit for sampling the received signal for a predefined period of time, giving rise to signal samples;
- b.3. a digital memory unit for storing the signal samples of said received signal in its memory in a given sampling order, on a time scale;
- b.4. a processing unit for reconstructing a signal by using said signal samples as data carriers, giving rise to a reconstructed digital signal;
- b.5. a D/A unit for converting said reconstructed digital signal to a reconstructed analog signal to be transmitted; and
- b.6. a transmitter for transmitting said reconstructed analog signal to be reflected from said corner reflector back towards said transmitting source substantially simultaneously from each of said at least two antennas.

According to still a further embodiment of the present invention, a system is configured to receive incoming signals from a transmitting source by means of at least two antennas and transmit outgoing signals back, substantially simultaneously, towards said transmitting source through said at least two antennas irrespective of the location of one antenna with respect to another and without calculating phase differences between said outgoing signals.

According to an embodiment of the present invention, reconstructing the signal comprises:

a) deciding about at least one sub-group of signal samples that are sampled within the predefined period of time;

b) inverting said sampling order of said signal samples within said at least one sub-group; and c) reconstructing said signal by using said signal samples, which have the inverted sampling order, as data carriers.

According to another embodiment of the present invention, reconstructing the signal comprises:

a) deciding about at least one sub-group of signal samples that are sampled within the predefined period of time;

b) performing phase conjugation of the signal samples within said at least one sub-group, giving rise to phase conjugated signal samples; and c) reconstructing said signal by using said phase conjugated signal samples as data carriers.

A method of transmitting a signal back towards a transmitting source comprises:

a) receiving a signal from a transmitting source;

b) sampling the received signal for a predefined period of time, giving rise to signal samples;

c) storing the signal samples in a given sampling order, on a time scale;

d) reconstructing a signal, including:
- d.1 deciding about at least one sub-group of signal samples that are sampled within said predefined period of time;
- d.2. inverting said sampling order of said signal samples within said at least one sub-group; and
- d.3. reconstructing said signal by using said signal samples, which have the inverted sampling order, as data carriers, giving rise to a reconstructed digital signal;

e) converting said reconstructed digital signal to a reconstructed analog signal; and f) transmitting said reconstructed analog signal back towards said transmitting source.

According to another embodiment of the present invention, a method of transmitting a signal back towards a transmitting source comprises:

a) receiving a signal from a transmitting source;

b) sampling the received signal for a predefined period of time, giving rise to signal samples;

c) storing the signal samples in a given sampling order, at the time scale;

d) reconstructing a signal, including:
- d.1. deciding about at least one sub-group of signal samples that are sampled within said predefined period of time;
- d.2. performing phase conjugation of signal samples within said at least one sub-group, giving rise to phase conjugated signal samples; and
- d.3. reconstructing said signal by using said signal samples, which have been phase conjugated, as data carriers, giving rise to a reconstructed digital signal;

e) converting said reconstructed digital signal to a reconstructed analog signal; and f) transmitting said reconstructed analog signal back towards said transmitting source.

According to still another embodiment of the present invention, a method of transmitting a signal back towards a transmitting source comprises:

a) providing a corner reflector, connected to at least two antennas;

b) receiving an incoming signal from a transmitting source by means of said at least two antennas;

c) sampling the received signal for a predefined period of time, giving rise to signal samples;

d) storing the signal samples in a given sampling order, at the time scale;

e) reconstructing a signal by using the signal samples as data carriers, giving rise to a reconstructed digital signal;

f) converting said reconstructed digital signal to a reconstructed analog signal; and g) transmitting said reconstructed analog signal to be reflected from said corner reflector back towards said transmitting source substantially simultaneously from each of said at least two antennas.

According to a further another embodiment of the present invention, a method relates to receiving incoming signals from a transmitting source by means of at least two antennas and transmitting outgoing signals back towards said transmitting source, substantially simultaneously, through said at least two antennas irrespective of the location of one antenna with respect to another and without calculating phase differences between said outgoing signals.

BRIEF DESCRIPTION OF THE DRAWINGS

In order to understand the invention and to see how it may be carried out in practice, preferred embodiments will now be described, by way of non-limiting examples only, with reference to the accompanying drawings, in which:

FIG. 1 is a schematic illustration of a digital retro-directive system for receiving signals from a transmitting source, and transmitting signals back towards said source from a plurality of antennas in a substantially simultaneous manner and in a substantially precise angular direction, according to an embodiment of the present invention;

FIGS. 5A and 5C are sample illustrations of (random) locations of a plurality of antennas, according to an embodiment of the present invention; and FIGS. 5B and 5D are constructive interference maps of signals transmitted from a plurality of antennas, according to an embodiment of the present invention.

Figure 2A:
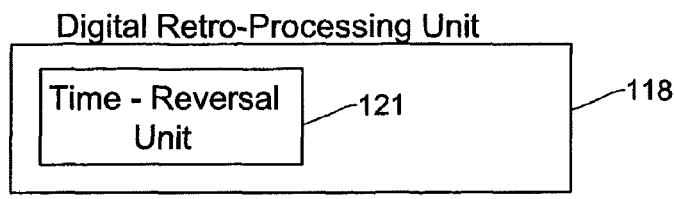
FIGS. 2A to 2D are schematic illustrations of a digital retro-processing unit, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, systems, procedures, techniques, units/components and the like have not been described in detail so as not to obscure the present invention.

FIG. 1 is a schematic illustration of a digital retro-directive system 100 for receiving signals from one or more transmitting sources, such as a source 150 and transmitting signals back towards said source 150 from a plurality of antennas in a substantially simultaneous (synchronous) manner and in a substantially precise angular direction, according to an embodiment of the present invention. According to this embodiment of the present invention, system 100 is a multi-channel system, comprising a plurality of antennas (such as two or more antennas 105', 105" and 105'", for example), wherein each antenna is connected to its corresponding communication unit 110. Communication unit 110 comprises a receiver 115 for receiving an incoming signal (such as an RF signal, an electromagnetic signal, an acoustic signal, a seismic signal, a photonic signal, etc.); an A/D (Analog-to-Digital) unit 117 for sampling the received signal, giving rise to signal samples; a digital memory unit, such as a DRFM (Digital Radio Frequency Memory) unit 125 for storing the signal samples in its memory to be reconstructed later; a digital retro-processing unit 118 for reconstructing a signal from signal samples stored within DRFM unit 125, said samples used as carriers for data to be transmitted, giving rise to a reconstructed digital signal; an D/A (Digital-to-Analog) unit 119 for converting said reconstructed digital signal to a reconstructed analog signal; and a transmitter 116 for transmitting the reconstructed analog signal back towards source 150. Hereinafter, for simplicity, the signals are considered to be RF signals; however, it should be noted that the signals can be of any type, such as electromagnetic (EM) signals, acoustic signals, seismic signals, photonic signals, etc.

According to an embodiment of the present invention, the RF signal transmitted from transmitting source 150 (such as, a wireless or RF device/system (e.g., a cellular system, a Wi-Fi system, a radar system, etc.), a satellite device/system, an acoustic device/system, a seismic device/system, and the like) is received by means of antennas 105', 105" and 105'". Then, the received signal is sampled by means of corresponding unit, such as A/D unit 117. It should be noted that samples are performed substantially simultaneously by means of A/D units 117 of said antennas 105', 105" and 105'". For example, for each time period of a double bandwidth length of the received RF signal (according to the NyquistShannon sampling theorem), one sample is made by means of each A/D unit 117. Each sample contains information regarding the amplitude and phase of the signal at a specific time instant (e.g., i=0.2 [nsec] (nanoseconds), 0.4 [nsec], etc.).

For example, it is supposed that the received signal $\phi_{R,n}(t)$ is defined by $\phi_{R,n}(t)=A_R \cdot \cos(wt+\phi_{R,n})$ wherein $A_R$ is an amplitude, w is a radian frequency, t is a time instant, $\phi_{R,n}$ is a phase, n is an antenna serial number (e.g., 1, 2, ...), and R symbolizes that the signal is received. Then, for example, at 1=0 and t=0.1 [nsec], signal $\phi_{R,n}(t)$ received by means of antenna 105' (n=1) is sampled, and the following samples are obtained:

$$\phi_{R,n}(0)=A_R \cdot \cos(w \cdot 0+\phi_R)=A_R \cdot \cos(\phi_R), \text{ and } \phi_{R,n}(0.1)=A_R \cdot \cos(w \cdot 0.1+\phi_R).$$

According to an embodiment of the present invention, the signal samples (a set of signal samples) $\phi_{R,n}(0)$ and $\phi_{R,n}(0.1)$ are stored in the sampling order, on a time scale, within corresponding DRFM units 125, and then such samples can be used as carriers for data to be transmitted back towards transmitting source 150. Said samples contain information regarding amplitude $A_R$ and reception phase $\phi_R$, of the signal received from said source 150 at each antenna 105', 105" and 105'". The incoming signal can be sampled, for example, during 1 [μsec](microseconds), while each sample can be taken each 0.1 [nsec]. It should be noted that since all samples are performed substantially simultaneously by means of A/D units 117 of said antennas 105', 105" and 105'", then the set of signal samples, stored within each DRFM unit 125, is substantially identical.

According to an embodiment of the present invention, the signal samples are reordered in an inverse sampling order by means of processing unit 118, such that the first sample becomes the last one, for a predefined period of time (e.g., for 1 microsecond), resulting in the time-reversal of the signal. Then, a new RF (digital) signal is reconstructed by using such inverted samples as data carriers, and then it is converted to an analog signal by means of each corresponding unit, such as D/A (Digital/Analog) unit 119 of each antenna 105', 105" and 105'". After this, it is transmitted back towards source 150. As a result, according to an embodiment of the present invention, the signal is transmitted towards source 150 without measuring an angular direction of said source 150, and without calculating the phase differences of the signal to be transmitted from each antenna within a predefined set (array) of antennas, such as antennas 105', 105" and 105'" (it should be noted that according to the prior art, the signal phase differences for each antenna have to be calculated for achieving the optimal effective radiation pattern (ERP) in a desired angular direction). For example, it is supposed that the first sample of the incoming signal received by antenna 105' is $R_{11}$, the second sample is $R_{12}$, the third sample is $R_{13}$ and the fourth sample is $R_{14}$. Thus, by inverting an order of the samples on the time scale, such that the first sample is $R_{14}$, the second is $R_{13}$, the third is $R_{12}$ and the fourth sample is $R_{11}$, and then using said samples as data carriers of the signal to be transmitted, enables transmitting said signal back towards the source in a substantially precise angular direction. Similarly, the samples of antenna n are reordered such that the first sample is $R_{n4}$, the second is $R_{n3}$, the third is $R_{n2}$ and the fourth sample is $R_{n1}$. Further, according to an embodiment of the present invention, there is no need in positioning (locating) antennas 105', 105" and 105'" on a straight plane because there is no need in determining phase differences of the outgoing signal to be transmitted back towards transmitting source 150 from each antenna. It should be noted that since the set of signal samples, stored within each DRFM unit 125, is substantially identical (because all samples are performed substantially simultaneously by means of A/D units 117 of said antennas 105', 105" and 105'"), then performing D/A conversion by means of D/A units 119 of said antennas 105', 105" and 105'" is also done substantially simultaneously at each antenna. As a result, reconstructed signals are transmitted back towards source 150 substantially simultaneously (synchronously) from each antenna (e.g., from antennas 105', 105" and 105'") within a set of antennas, and then, in turn, said reconstructed signals are coherently received at transmitting source 150. It should be noted that according to an embodiment of the present invention, each antenna 105', 105", and 105'" is an antenna element within a set of mutually synchronized antenna elements, such as shown on FIG. 3A. Also, according to another embodiment of the present invention, each antenna 105', 105", and/or 105'" comprises two or more mutually synchronized antenna elements, wherein each antenna element can have a communication unit, such as unit 110.

Further, it should be noted that according to an embodiment of the present invention, by inverting the order of signal samples, the modulation of the transmitted (outgoing) signal $\phi_{T,n}(t)$ (compared to the modulation of the received (incoming) signal $\phi_{R,n}(t)$) is also inverted. For example, if the modulation of the received signal is linear, then the modulation of the transmitted signal is also linear, but inverted on a time scale. According to an embodiment of the present invention, transmitting source 150 is configured to transmit incoming RF signals and receive back outgoing RF signals, reconstructed from samples of said incoming RF signals, wherein for reconstructing the outgoing RF signals the samples are organized in an inverted sampling order, on a time scale. Transmitting source 150 receives said outgoing RF signals from at least one antenna, demodulates them and processes the demodulated data. According to another embodiment of the present invention, for demodulating said outgoing RF signals, transmitting source 150 is configured to determine that these RF signals have inverted modulation. For this, transmitting source 150 can be provided with corresponding software and/or hardware processing means.

It is supposed, for example, that the incoming RF signal, received by means of antenna 105', is defined by $\phi_{R,n}(t)= A \cdot \cos(wt + \phi_{R,n})$, wherein A is an amplitude of said signal, w is a radian frequency, t is a time parameter, $\phi_{R,n}$ is a phase, n is an antenna serial number (e.g., 1, 2, . . . ), and the letter R symbolizes that the signal is received. The requirement for getting a constructive interference in the angular direction, from which the signal is received, is: $\forall n, \phi_{R,n}+\phi_{T,n}=$const, wherein const is any constant (e.g., 0, 10, −10, etc.) substantially identical for all antenna elements, and $\phi_{T,n}$ is the phase of the signal to be transmitted from antenna n. This requirement is equivalent to $\forall n,m \phi_{T,n}-\phi_{T,m}=-(\phi_{R,n}-\phi_{R,m})$, and therefore, it ensures that all signals arrive to source 150 with the same phase. Thus, the transmitted (output) RF signal may be represented as:

$$\begin{aligned}\phi_{T,n}(t) &= A\cos(\omega t + \varphi_{T,n}) \\ &= A\cos(\omega t + (const - \varphi_{R,n})) \\ &= A\cos(\omega t - \omega T' - \varphi_{R,n}) = \\ &= A\cos(\omega T' - \omega t + \varphi_{R,n}) \\ &= \phi_{R,n}(T' - t),\end{aligned}$$

wherein $\phi_{T,n}$ is a phase of the transmitted signal, T' relates to a predefined period of time (e.g., 1 microsecond), T symbolizes that the signal is transmitted, and const is selected as: $-\omega T'$ (w is a radian frequency). From the above it follows that if the signal is transmitted from its end to the beginning (on a time scale, by inverting an order of signal samples, used as data carriers), a constructive interference in a direction from which the signal was received is achieved. As a result, each reconstructed RF signal is transmitted back towards source 150 from each corresponding antenna 105', 105" and 105'" in a substantially precise angular direction.

It should be noted that according to an embodiment of the present invention, each reconstructed RF signal is transmitted back towards source 150 by means of the same antenna (e.g., antenna 105', 105" or 105'"), through which the original corresponding signal from source 150 was received. Further, it should be noted that according to an embodiment of the present invention, the reconstructed RF signals are transmitted back towards source 150 in a substantially simultaneous (synchronous) manner from each antenna within a set of antennas (e.g., the set of antennas comprising two or more antennas, such as antennas 105', 105" and 105'").

According to another embodiment of the present invention, the multi-pass communication with two or more transmitting sources 150 is enabled, without the need in determining phases of the signals to be transmitted back towards said sources from a plurality of antennas 105', 105" and/or 105'" (without the need in determining angular directions of said two or more transmitting sources), and without the need in positioning the plurality antennas on a straight plane. In addition, said two or more transmitting sources 150 can be either far-distanced and/or located in proximity (near-field) to said plurality of antennas 105', 105" and/or 105'''. It should be noted that each source can transmit/receive a different RF signal. Further, it should be noted that according to an embodiment of the present invention, antennas 105', 105" and/or 105''' (their corresponding communication units 110) are not synchronized with transmitting source 150, i.e., are asynchronous to said source 150 either at the time and/or frequency domain.

According to an embodiment of the present invention, system 100 can be used in various applications, such as medical, military, space applications and the like. For example, by placing a set (plurality) of antennas around a human body, positioning a transmitting source (transmitter) within a cancerous growth inside the body, then receiving a signal from said transmitter, and after this transmitting a signal back to said source from the plurality of antennas in a substantially synchronous manner, can destroy such a cancerous growth at its exact location, and not accidentally damage other organs within the body.

According to another embodiment of the present invention, after the incoming signal is sampled by means of corresponding communication unit 110 of each antenna (by means of its corresponding A/D unit 117), the phase sign of the signal received at each antenna is inverted by means of digital retro-processing unit 118, resulting in obtaining phase conjugation of the signal. It should be noted that phase conjugation corresponds to selecting const ($\forall n$, $\phi_{R,n}+\phi_{T,n}$=const) to be equal "0", and therefore $\forall n$, $\phi_{T,n}=-\phi_{R,n}$ and, as result, the retro-directive transmission is enabled. This can be achieved, for example, by digitally multiplying each signal sample by a function/signal, such as cosine($2\omega t$), and then digitally low-pass filtering the result of the above multiplication. Also, it should be noted that signal sampling is performed substantially synchronously by means of A/D units 117 of each antenna 105', 105" and 105'''. The phase conjugated samples are stored within DRFM unit 125 of each antenna, and the amplitude of each signal sample is related to a particular time instant (e.g., $r$=0.2 [nsec], 0.4 [nsec], etc.). Since all samples are obtained substantially simultaneously, the set of signal samples, stored within each DRFM unit 125, is substantially identical (up to a time shift). It should be noted that according to an embodiment of the present invention, the signal samples can be used later as carriers for transmitting data back towards source 150.

It is supposed, for example, that received signal $\phi_{R,n}(t)$ is defined by $\phi_{R,n}(t)=A_R\cdot\cos(wt+\phi_{R,n})$ and transmitted signal $\phi_{T,n}(t)$ is defined by $\phi_{T,n}(t)=A_T\cdot\cos(wt+\phi_{T,n})$ wherein $A_R$ and $A_T$ are amplitudes, w is a radian frequency, t is a time parameter, $\phi_{R,n}$ and $\phi_{T,n}$ are corresponding phases, n is an antenna serial number (e.g., 1, 2, . . . ), the letter R symbolizes the signal that is received, and the letter T symbolizes the signal that is transmitted. The requirement for getting a constructive interference in a direction from which the signal was received is: $\forall n$, $\phi_{R,n}+\phi_{T,n}$=const, wherein const is any constant (e.g., 0, 10, −10, etc.) substantially identical for all antenna elements. Thus, for example, for const=0, signal $\phi_{R,n}(t)$ to be transmitted can be such as: $\phi_{R,n}(t)=A_T\cos(\omega t+\phi_{T,n})=A_T\cos(\omega t+(\text{const}-\phi_{R,n}))=A_T\cos(\omega t-\phi_{R,n})$. Signal $\phi_{T,n}(t)$ is transmitted towards source 150 without measuring an angular direction of said source 150, and without calculating the phase differences of the signal to be transmitted from each antenna (it should be noted that according to the prior art, the signal phase differences for each antenna have to be calculated in order to achieve an effective radiation pattern in a desired angular direction). As a result, there is also no need in positioning antennas 105', 105" and 105''' on a straight plane because there is no need in determining the above signal phase differences.

According to an embodiment of the present invention, the phase conjugation used for transmitting signals back towards transmitting source 150 may be applied to each frequency component of a wideband signal:

$$\phi_{R,n}(t) = \sum_{i=1}^{L} A_{R,i}\cos(w_i t + \varphi_i^{R,n})$$

$$\phi_{T,n}(t) = \sum_{i=1}^{L} A_{T,i}\cos(w_i t + \varphi_i^{T,n}) = \sum_{i=1}^{L} A_{T,i}\cos(w_i t - \varphi_i^{R,n})$$

wherein $\phi_{R,n}(t)$ is a received signal, $\phi_{T,n}(t)$ is a transmitted signal, $A_{R,i}$ and $A_{T,i}$ are amplitudes, $w_i$ is a radian frequency, t is a time parameter, $\varphi_i^{R,n}$ and are $\varphi_i^{T,n}$ are phases of corresponding received and transmitted signals, n is an antenna serial number (e.g., 1, 2, . . . ), and i is an index varied from 1 to L. This may be achieved by performing spectral decomposition of said wideband signal and performing phase conjugation of each component, such that:

$$\phi_{T,n}(1:N)=\text{IFFT}(conj(\text{FFT}(\phi_{R,n}(1:N)))),$$

wherein FFT is a Fast Fourier Transform, spectrally decompositing the signal to its frequency components; IFFT is an Inverse FFT; conj relates to obtaining a complex conjugate of a result of the FFT; and N is the number of samples to be retro-transmitted, i.e., N is the FFT length.

It should be noted that the above wideband phase conjugation is mathematically equivalent to the time reversal (of the cyclic continuation of the signal to be conjugated); this arises due to phase anti-symmetry of the Fast Fourier Transform. In addition, it should be noted that according to another embodiment of the present invention, other spectral decomposition analyses or other transforms can be implemented instead of the Fast Fourier Transform and Inverse Fast Fourier Transform.

According to an embodiment of the present invention, for a narrowband signal, the phase shift $\Delta\phi_n$ in $\Delta\phi_n=\phi_{T,n}-\phi_{R,n}=\text{const}-2\phi_{R,n}$ ($\phi_{R,n}+\phi_{T,n}$=const) is equivalent to the time-reversal (through the term $-2\phi_{R,n}$ is responsible for the retro effect) and an arbitrary time delay $\Delta t_n$: $\Delta t_n$=const/w. It should be noted that const is any constant (e.g., 0, 10, −10, etc.); $\phi_{T,n}$ is the phase of the signal to be transmitted; $\phi_{R,n}$ is the phase of the received signal; and w is a radian frequency (w=$2\pi\cdot$f (f is a frequency)).

According to another embodiment of the present invention, this may be applied to each frequency component of a wideband signal:

$$\phi_{R,n}(t) = \sum_{i=1}^{L} A_i\cos(w_i t + \varphi_i^{R,n})$$

$$\phi_{T,n}(t) = \sum_{i=1}^{L} A_i\cos(w_i t + \varphi_i^{T,n})$$

wherein $$\varphi_i^{T,n} + \varphi_i^{R,n} = C_i = \alpha\cdot w_i$$

and hence $\forall i$, $$\Delta t_n = \frac{C_i}{w_i} = \alpha.$$

α is a constant; and i is an index. The definition of the constants $C_i$ ensures that the time delays are identical for all frequency components from i=1 to i=L. As a result, the constructive interference of all frequency components may be obtained by assigning any parameters $\alpha \in \Re$ (real number).

It should be noted that according to an embodiment of the present invention, by using the above presented time reversal and phase conjugation methods, the constructive interference at transmitting source 150 is independent of the bandwidth and modulation of the transmitted signal. Also, an assumption that transmitting source 150 is far-distanced to allow linear phase front, is not required. In addition, since the above equations (of $\phi_{R,n}(t)$ and $\phi_{T,n}(t)$) for a wideband signal may represent a group of narrowband transmitting sources as well, the requirement for $\Delta t_n = C_i/w_i$ ensures the retro-effect (either phase conjugation or time reversal) independent of the number of transmitting sources and their locations.

Also, it should be noted that according to an embodiment of the present invention, a constructive interference may be achieved by assigning any real value to parameter a, wherein $\alpha \in \Re$. For example, $C_i = 0$ with $\alpha = 0$ (for performing phase conjugation), or $C_i = -\omega \cdot T$ with $\alpha = -T$ (for performing time reversal).

Further, it should be noted that according to an embodiment of the present invention, the location of transmitting source 150, and/or antennas 105', 105", 105''', etc., and/or any component/unit of communication unit 110 (such as receiver 115 and/or transmitter 116) can be either static or mobile: for example, they can be airborne, sailed by a ship or carried by a vehicle, person, and the like. Also, it should be noted that if said transmitting source 150 and/or antennas 105', 105", 105''' are dynamically relocated, then an appropriate compensation for such relocation can be applied.

It should be noted that according to an embodiment of the present invention, the reconstructed digital signal is transmitted back towards transmitting source 150 by means of, for example, two or more antennas 105', 105", 105''' with a delay (e.g., a second, a minute, an hour, and the like).

In addition, it should be noted that according to another embodiment of the present invention, digital retro-processing unit 118 is incorporated within transmitter 116.

Further, it should be noted transmitting source 150 may also receive signals transmitted towards it, and process the received signals accordingly.

FIGS. 2A to 2D are schematic illustrations of digital retro-processing unit 118, according to an embodiment of the present invention. Digital retro-processing unit 118 of FIG. 2A comprises a time-reversal unit 121, which enables recording T seconds of samples of received signal $\phi_{R,n}(t)$, and then enables reordering the recorded samples in a reversed order, equivalent to assigning $\alpha = -T$ in equation $C_i = \alpha \cdot w_i$, presented above. By recording T seconds of samples of received signal $\phi_{n,i}^R(t)$, the following signal is obtained at each antenna (e.g., by ignoring the communication channel noise):

$$\phi_{n,i}^R(t) = \sum_{i=1}^{L} \phi_{n,i}^R(t) = \sum_{i=1}^{L} A_i \cdot \cos(w_i t + \varphi_{n,i}^R),$$

wherein A is an amplitude of the signal; w is a radian frequency; t is a time parameter; $\phi_{n,i}^R$ is a phase of the $i^{th}$ spectral component of received signal $\phi_{n,i}^R(t)$; n is an antenna serial number (e.g., 1, 2, ...); i is a signal index; and the letter R symbolizes that the signal is received.

According to an embodiment of the present invention, the constructive interference is achieved by reordering the recorded signal samples from the end to beginning, such that the signal to be transmitted is:

$$\phi_n^T(t) = \sum_{i=1}^{L} A_i \cos(w_i t + (C_i - \varphi_{n,i}^R))$$

$$= \sum_{i=1}^{L} A_i \cos(w_i t - w_i T - \varphi_{n,i}^R)$$

$$\stackrel{\cos(-x)=\cos(x)}{=} \sum_{i=1}^{L} A_i \cos(w_i(T-t) + \varphi_{n,i}^R)$$

$$= \sum_{i=1}^{L} \phi_{n,i}^R(T-t) = \phi_n^R(T-t)$$

From the above it follows that if the signal is transmitted from its end to the beginning (on a time scale, by inverting an order of signal samples, used as data carriers), a constructive interference in a direction, from which the signal was received, is achieved. As a result, each reconstructed RF signal is transmitted back towards source 150 (FIG. 1) from each corresponding antenna 105', 105" and 105''' (FIG. 1) in a substantially precise angular direction.

It should be noted that according to this embodiment of the present invention, by inverting the order of signal samples, the modulation of the transmitted (outgoing) signal $\phi_{T,n}(t)$ (compared to the modulation of the received (incoming) signal $\phi_{R,n}(t)$) is also inverted. For example, if the modulation of the received signal is linear, then the modulation of the transmitted signal is linear but inverted in time (time reversal). For example, if the received signal is characterized by having frequencies raising from the lower to higher frequency, then inverting an order of the signal samples results in obtaining a signal, in which frequencies are changed from the higher to lower frequency. According to an embodiment of the present invention, transmitting source 150 is configured to transmit incoming RF signals and receive back outgoing RF signals, reconstructed from samples of said incoming RF signals, wherein for reconstructing the outgoing RF signals the samples are organized in an inverted sampling order, on a time scale. Transmitting source 150 receives said outgoing RF signals from at least one antenna, demodulates them and processes the demodulated data. According to another embodiment of the present invention, for demodulating said outgoing RF signals, transmitting source 150 is configured to determine that these RF signals have inverted modulation. For this, transmitting source 150 can be provided with corresponding software and/or hardware processing means.

Figure 2B:
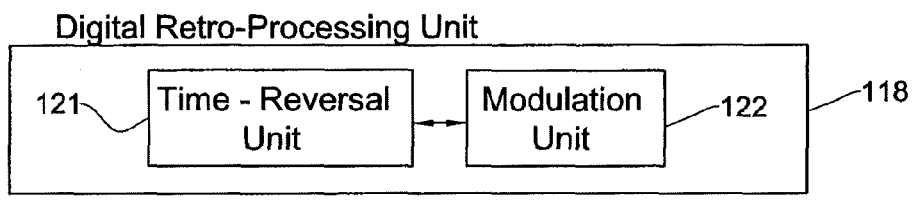

According to another embodiment of the present invention, digital retro-processing unit 118 further comprises modulation unit 122, as shown on FIG. 2B for modulating the signal with the inverted order of its samples. For this, time dependency t is added to the constant $\beta$. This leads to modulating the signal from transmitting source 150, using the received signal as data carrier. Modulated transmitted signal $\phi_{T,n}(t)$ can be as follows:

$$\phi_{T,n}(t) = \beta(t) \cdot \phi_{R,n}(T-t),$$

wherein $\beta(t)$ represents the amplitude modulation (AM).

Figure 2C:
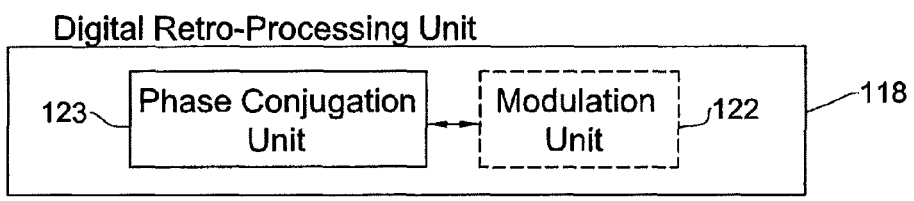

According to still another embodiment of the present invention, digital retro-processing unit 118 comprises phase conjugation unit 123 and, optionally, modulation unit 122, as presented on FIG. 2C. According to this embodiment of the present invention, after the incoming signal is sampled by means of corresponding communication unit 110 (FIG. 1) of each antenna, a sign of the phase of each received signal is inverted by means of processing unit 118, resulting in obtaining phase conjugation of the signal. This can be done, for example, by digitally multiplying each sample by a function/signal, such as cosine(2 wt), and then digitally low-pass filtering the result. Then, the phase conjugated samples (having inverted phase signs) are stored within DRFM unit 125 (FIG. 1) of each antenna. It should be noted that the amplitude of each signal sample relates to a particular time instant (e.g., t=0.2 [nsec], 0.4 [nsec], etc.). The signal samples can be used later as carriers for transmitting data back towards source 150 (FIG. 1).

It should be noted that for the case of phase conjugation (for example, for narrowband signals), constant $\alpha$=0, and in turn constant C=0 ($\phi_n^T + \phi_n^R$=C and C=$\alpha \cdot$w, wherein $\phi_n^R$ is a phase of the received signal; $\phi_n^T$ is a phase of the transmitted signal; n is an antenna serial number (e.g., 1, 2, . . . ); the letter R symbolizes that the signal is received, and the letter T symbolizes that the signal is transmitted). According to an embodiment of the present invention, the phase conjugated signal to be transmitted is modulated by means of modulation unit 122. For this, time dependency t is added to the constant $\alpha$. This leads to digitally modulating the signal from transmitting source 150, using the received signal as data carrier:

$$\forall n \phi_n^T + \phi_n^R = C(t) = \alpha(t) \cdot w$$

wherein $\phi_n^T$ is a phase of the transmitted signal; and $\phi_n^R$ is a phase of the received signal. As a result, modulated transmitted signal $\phi_{T,n}(t)$ can be as follows:

$$\phi_{T,n}(t) = \beta(t) \cdot A \cos(w(t+\alpha(t)) - \phi_n^R),$$

wherein $\beta(t)$ represents the amplitude modulation.

It should be noted that the phase conjugated signal to be transmitted can be modulated by its amplitude and phase by means of using parameters $\beta(t)$ and $\alpha(t)$, respectively.

Figure 2D:
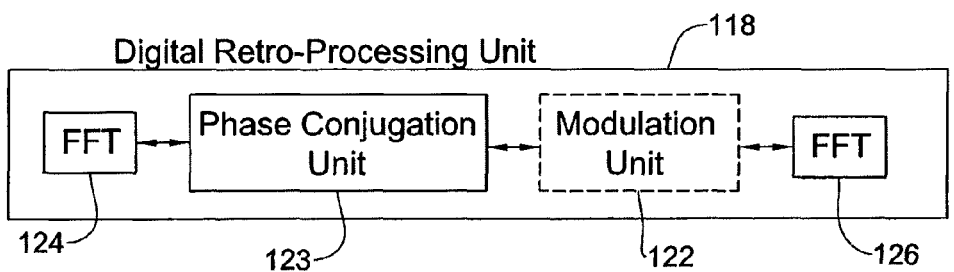

According to a further embodiment of the present invention, digital retro-processing unit 118 comprises FFT (Fast Fourier Transform) unit 124, phase conjugation unit 123, IFFT (Inverse FFT) unit 126 and, optionally, modulation unit 122, as presented on FIG. 2D. This embodiment can be used for receiving/transmitting wideband signals $\phi_{R,n}(t)$ and $\phi_{T,n}(t)$, wherein $\phi_{n,i}^T$ is a phase of the transmitted signal and $\phi_{n,i}^R$ is a phase of the received signal, and $\phi_{n,i}^T = \phi_{n,i}^R$ ($\alpha$=0, and in turn $C_i$=0, wherein i is a signal index). Thus, the overall retro-transmitted wideband signal is given by:

$$\phi_{T,n}(1:N) = \text{IFFT}(conj(\text{FFT}(\phi_{R,n}(1:N)))),$$

wherein FFT is a Fast Fourier Transform, spectrally decompositing the signal to its frequency components; IFFT is an Inverse FFT; conj relates to obtaining a complex conjugate of a result of the FFT; and N is the number of samples to be retro-transmitted. It should be noted that phases $\phi_n^R$ are obtained by means of the Fourier analysis, the phase conjugation ensures that $\phi_n^T = -\phi_n^R$, and the inverse transform (IFFT) yields the phase conjugated signal. Further, the phase conjugated signal to be transmitted is modulated by means of modulation unit 122. For this, time dependency t is added to constant $\alpha$($C_i = \alpha \cdot w_i$). This leads to digitally modulating the signal from transmitting source 150, using the received signal as data carrier:

$$\forall n, i \phi_{n,i}^T + \phi_{n,i}^R = \alpha(t) \cdot w_i,$$

wherein $\phi_{n,i}^T$ is a phase of the transmitted signal; and $\phi_{n,i}^R$ is a phase of the received signal. As a result, a modulated wideband transmitted signal $\phi_{T,n}(t)$ can be as follows:

$$\phi_{T,n}(t) = \beta(t) \cdot \sum_{i=1}^{L} A_i \cos(w_i(t + \alpha(t)) - \varphi_{n,i}^R),$$

wherein $\beta(t)$ is the amplitude modulation of transmitted signal; and L is the number of simultaneously received narrowband signals. It should be noted that the phase conjugated signal to be transmitted can be modulated by its amplitude or phase by means of using parameters $\beta(t)$ and $\alpha(t)$. Then, the modulated wideband signal $\phi_{T,n}(t)$ may be retro-transmitted, when required. This can be achieved by the following operation on the recorded (stored) samples:

$$\phi_{T,n}(1:N) = \beta(t) \cdot \text{IFFT}(e^{i\alpha(t) \cdot \overline{w}} \cdot conj(\text{FFT}(\phi_{R,n}(1:N)))),$$

wherein $$\overline{w} = 2\pi \cdot ([0:(N/2-1), N/2, (-N/2+1):-1]) \cdot \frac{f_s}{N}$$

($f_s$ is a sampling frequency and N the FFT length).

Figure 3A:
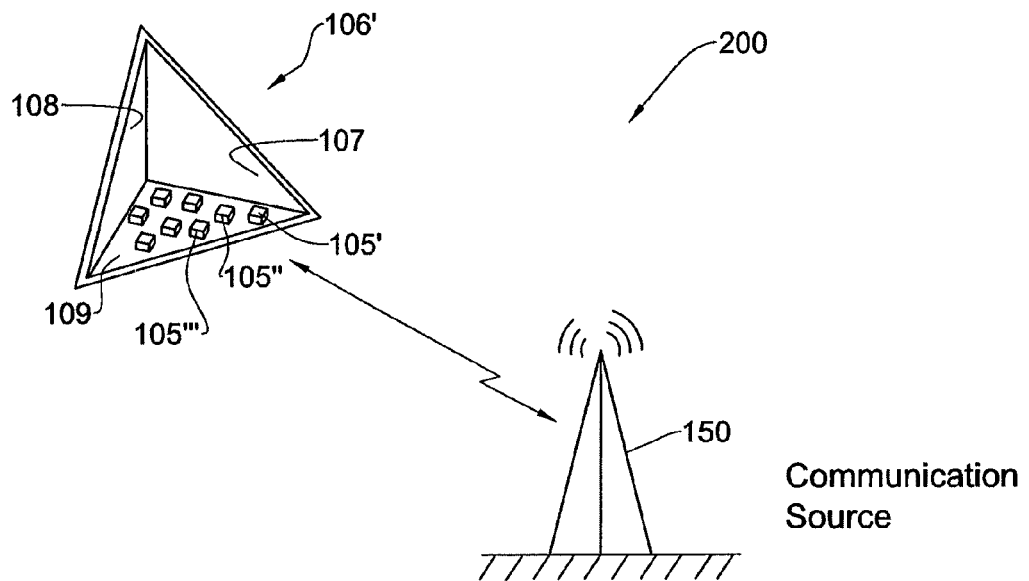
FIG. 3A is a schematic illustration of a digital retro-directive system for receiving signals from a transmitting source, and transmitting signals back towards said source in a substantially simultaneous manner and in a substantially precise angular direction, according to another embodiment of the present invention.

FIG. 3A is a schematic illustration of a digital retro-directive system 200 for receiving signals from one or more transmitting sources, such as a source 150 and transmitting signals back towards said source 150 in a substantially simultaneous manner and in a substantially precise angular direction, according to another embodiment of the present invention. According to this embodiment of the present invention, a corner reflector 106' is provided, being connected to a plurality of antennas (such as two or more antenna elements 105', 105", 105''', for example) by means of its intersecting substantially flat surfaces 107, 108 and/or 109.

According to an embodiment of the present invention, each antenna 105', 105" and 105''' can be positioned on (connected to) the one or more intersecting flat surfaces (e.g., flat surface 109) of the corner reflector, and the antennas can be distanced one from another at a distance of, for example, a half wavelength $\lambda/2$ of the highest radio frequency to be used for the signal transmission. Further, each antenna is connected to its corresponding communication units 110 (FIG. 1) that comprises a receiver 115 (FIG. 1) for receiving an incoming RF signal; an A/D (Analog-to-Digital) unit 117 (FIG. 1) for sampling the received RF signal; a digital memory unit, such as a DRFM (Digital Radio Frequency Memory) unit 125 (FIG. 1) for storing the signal samples in its memory to be reconstructed later; a digital retro-processing unit 118 (FIG. 1) for reconstructing a RF signal from signal samples stored within DRFM unit 125 (FIG. 1), said samples used as carriers for data to be transmitted, giving rise to a reconstructed digital RF signal; a D/A (Digital-to-Analog) unit 119 for converting said reconstructed digital RF signal to a reconstructed analog RF signal; and a transmitter 116 (FIG. 1) for transmitting the reconstructed analog RF signal back towards source 150.

It is supposed that the incoming RF signal from transmitting source 150 hits corner reflector 106', and then it is detected by means of the set of antennas attached to the surface (such as antennas 105', 105" and 105'''). The RF signal is sampled by means of a corresponding unit, such as A/D unit 117 of each antenna, and then the signal samples are stored within corresponding DRFM units 125 of each antenna, for later usage. It should be noted that since all samples (resulting in a set of samples) are performed substantially simultaneously (synchronously) by means of A/D units 117 of said antennas, and then the set of signal samples, stored within each DRFM unit 125, is substantially identical. After this, upon the need, RF signals are reconstructed from the stored signal samples (by means of processing unit 118 of each antenna). Each reconstructed RF digital signal is converted back to an analog signal by means of a corresponding unit, such as Digital-to-Analog (D/A) unit 119. Then, the analog signal is transmitted by means of transmitter 116 of each corresponding antenna within set of antennas, and when the reconstructed RF signal hits the corner reflector, it is reflected back towards source 150. It should be noted that since the set of signal samples, stored within each DRFM unit 125, is substantially identical (because all samples are performed substantially simultaneously by means of A/D units 117 of said antennas 105', 105" and 105'''), then performing D/A conversion by means of D/A units 119 of said antennas 105', 105" and 105''' is also done substantially simultaneously at each antenna. As a result, the signal after the D/A conversion is transmitted back towards source 150 substantially simultaneously from each antenna.

It should be noted that according to an embodiment of the present invention, due to the geometry of the corner reflector, the round signal communication paths from transmitting source 150 to each antenna 105', 105" and 105''', and vice versa, are equal. Thus, to achieve the constructive interference at transmitting source 150, the shift of phase $\phi_n^T$ of the signal to be transmitted, relative to phase $\phi_n^T$ of the received signal, is given by:

$$\forall n \Delta \phi_n = \phi_n^T - \phi_n^R = \text{Const} = C$$

This means that phases of signals, received at each antenna, substantially do not require manipulations for enabling their retro-directivity back towards transmitting source 150. Constant C defines an arbitrary phase delay, applied substantially identically to all antennas within the set.

It should be noted that according to an embodiment of the present invention, antenna elements 105', 105", 105''' are mutually synchronized for enabling transmitting the reconstructed RF signal back towards transmitting source 150 in a substantially precise angular direction. In addition, it should be further noted that according to this embodiment of the present invention, modulation of the transmitted signal $\phi_{T,n}(t)$ remains the same as the modulation of the received signal $\phi_{R,n}(t)$. According to an embodiment of the present invention, signal $\phi_{T,n}(t)$ is transmitted towards source 150 (by being reflected from corresponding corner reflector) without measuring an angular direction of said source 150, and without calculating the phase differences of the signal to be transmitted from each antenna 105', 105" and 105''' (that is required, according to the prior art, for getting the greatest overall ERP in the direction, to which the RF signal is transmitted). As a result, there is also no need in positioning antennas within each set of antennas 105', 105" and 105''' on a straight plane because there is no need in determining the above signal phase differences.

Figure 3B:
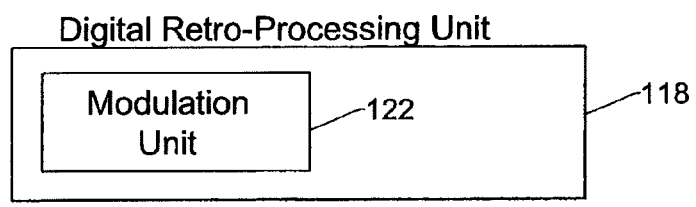
FIG. 3B is a schematic illustration of a digital retro-processing unit to be provided for each antenna located on a corner reflector, according to another embodiment of the present invention.

FIG. 3B is a schematic illustration of digital retro-processing unit 118 to be provided for each antenna 105', 105" of 105''' (FIG. 3A) located on corner reflector 106', according to another embodiment of the present invention. According to an embodiment of the present invention, the signal to be transmitted is modulated by means of modulation unit 122. For this, time dependency t is added to constant α ($C_i = \alpha \cdot w_i$ and $\Delta \phi_{n,i} = \phi_{n,i}^T - \phi_{n,i}^R = C_i$). This leads to digitally modulating the signal from transmitting source 150 (FIG. 3A), using the received signal as data carrier:

$$\forall n, i \phi_{n,i}^T - \phi_{n,i}^R = C_i(t) = \alpha(t) \cdot w_i,$$

wherein $\phi_{n,i}^T$ is a phase of the transmitted signal; and $\phi_{n,i}^R$ is a phase of the received signal. As a result, a modulated transmitted wideband signal $\phi_{T,n}(t)$ can be as follows:

$$\phi_{T,n}(t) = \beta(t) \cdot \sum_{i=1}^{L} A_i \cos(w_i(t + \alpha(t)) + \varphi_{n,i}^R),$$

wherein β(t) is the amplitude modulation of transmitted signal; and L is a number of simultaneously received narrowband signals. It should be noted that the phase conjugated signal to be transmitted can be modulated by its amplitude or phase by means of using parameters β(t) and α(t). Then, the modulated wideband signal $\phi_{T,n}(t)$ may be retro-transmitted, when required. The modulation can be implemented as follows:

$$\phi_{T,n}(1:N) = \beta(t) \cdot \text{IFFT}(e^{i\alpha(t) \cdot \overline{w}} \cdot \text{FFT}(\phi_{R,n}(1:N))),$$

wherein $$\overline{w} = 2\pi \cdot ([0:(N/2-1), N/2, (-N/2+1):-1]) \cdot \frac{f_s}{N}$$

($f_s$ is a sampling frequency and N the FFT length).

Figure 4A:
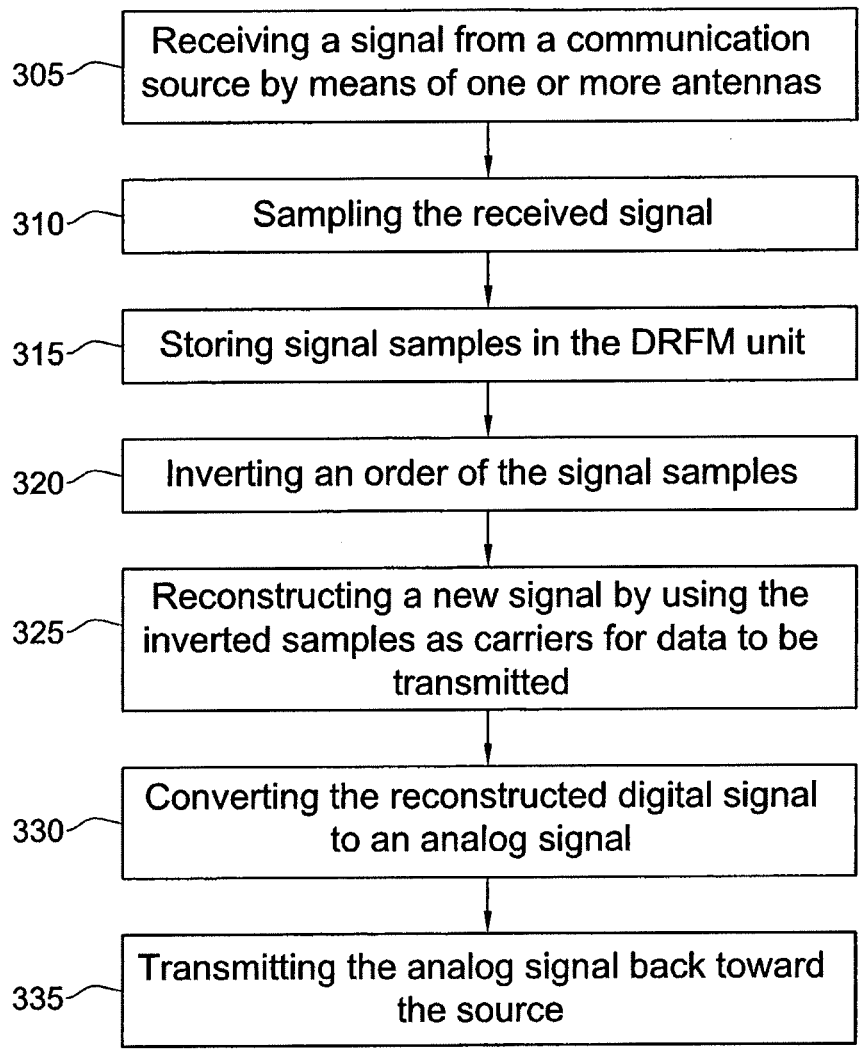
FIGS. 4A to 4C are flow charts of retro-directive methods for transmitting signals back towards a transmitting source in a substantially synchronous manner and in a substantially precise angular direction, according to embodiments of the present invention.

FIG. 4A is a flow chart of a retro-directive method for transmitting signals back towards transmitting source 150 (FIG. 1) in a substantially synchronous manner and in a substantially precise angular direction, according to an embodiment of the present invention. At step 305, the incoming RF signal is received by means of antennas 105', 105" and 105''' (FIG. 1). Then, at step 310, the signal is sampled by means of A/D unit 117 (FIG. 1) provided within communication unit 110 (FIG. 1) of each antenna. At step 315, each signal sample is stored within corresponding DRFM units 125 (FIG. 1) of each antenna. After this, at step 320, an order of the signal samples is inverted, such that for a predefined period of time (e.g., 1 microsecond), the first sample becomes the last one. At step 325, a new signal is reconstructed by using said inverted signal samples as carriers for data to be transmitted, giving rise to a reconstructed digital RF signal. Then, at step 330, said reconstructed digital RF signal is converted by means of D/A unit 119 (FIG. 1) into a reconstructed analog RF signal, which is transmitted back towards source 150 by means of transmitter 116, at step 335. For example, it is supposed that the first sample of a signal received by antenna 105' is $R_{11}$, the second is $R_{12}$, the third is $R_{13}$ and the fourth sample is $R_{14}$. Thus, by reordering said samples in an inverse order, such that the first sample is $R_{14}$, the second is $R_{13}$, the third is $R_{12}$ and the fourth sample is $R_{11}$, and then using said samples as carriers for the data to be transmitted, enables transmitting said signal back towards source 150 in a substantially precise angular direction. Further, according to an embodiment of the present invention, there is no need in positioning antennas 105', 105" and 105''' on a straight plane since there is no need in determining phase differences of a signal to be transmitted from each antenna.

Figure 4B:
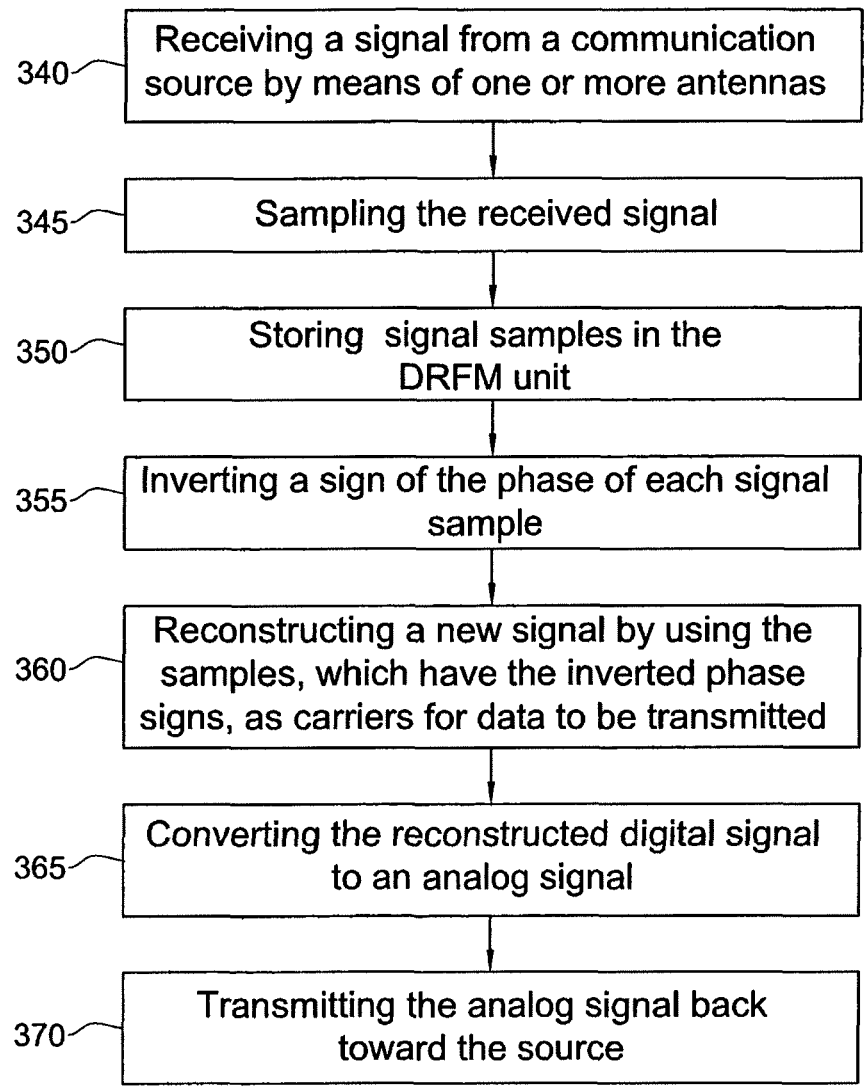

FIG. 4B is a flow chart of a retro-directive method for transmitting signals back towards transmitting source 150 (FIG. 1) in a substantially synchronous manner and in a substantially precise angular direction, according to another embodiment of the present invention. At step 340, the incoming RF signal is received by means of each antenna 105', 105" and 105''' (FIG. 1). Then, at step 345, the signal is sampled by means of A/D unit 117 (FIG. 1) provided within communication unit 110 (FIG. 1) of each antenna. After this, at step

350, the amplitude of each signal sample is stored within corresponding DRFM unit 125 (FIG. 1) of each antenna. It should be noted that the amplitude of each sample relates to a particular time instant (e.g., t=0.2 [nsec], 0.4 [nsec], etc.). At step 355, a sign of the initial phase of each signal is inverted (for example, by means of multiplying each signal by a function/signal, such as cosine(2 wt) for narrowband signal, or by using FFT for wideband signals. This results in obtaining phase conjugated signals. At step 360, a new signal is reconstructed by using said samples that have been phase conjugated as carriers of data to be transmitted, giving rise to a reconstructed digital RF signal. Then, at step 365, said reconstructed digital RF signal is converted by means of D/A unit 119 (FIG. 1) into a reconstructed analog RF signal, which is transmitted back towards source 150 by means of transmitter 116 (FIG. 1), at step 370.

It should be noted that according to an embodiment of the present invention, each reconstructed RF signal is transmitted back towards source 150 by means of the same antenna (e.g., antenna 105', 105" or 105'''), through which the original corresponding signal from source 150 was received.

Figure 4C:
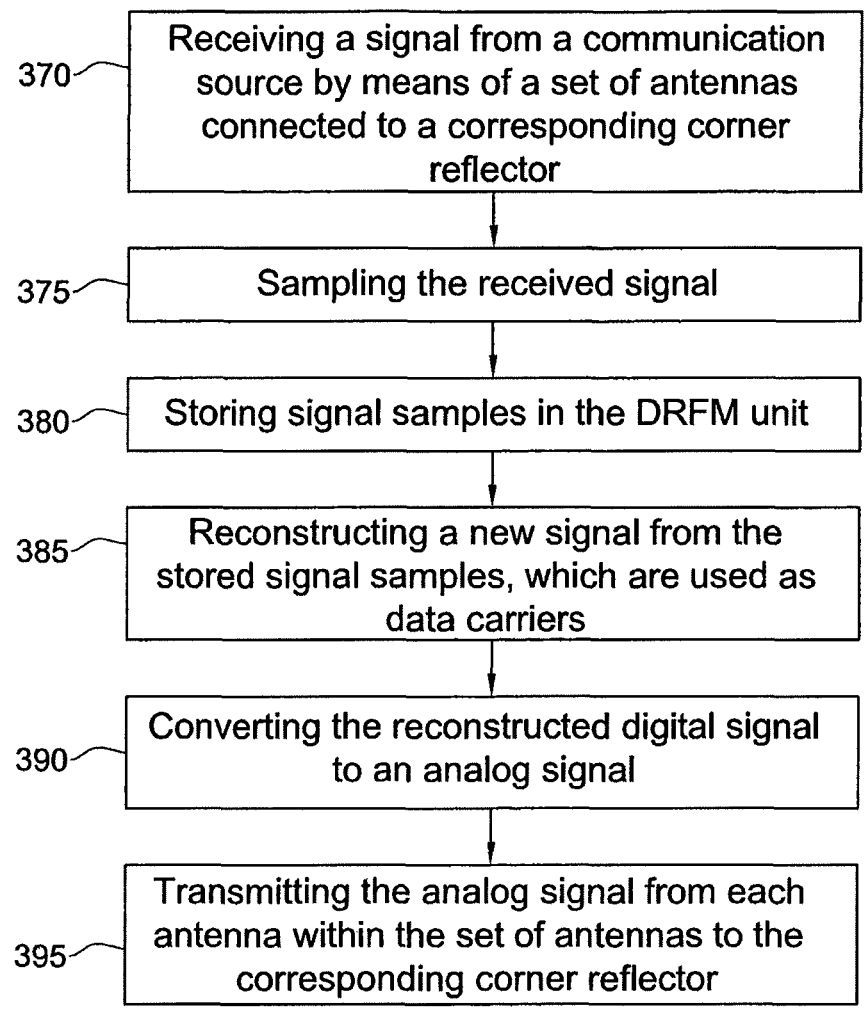

FIG. 4C is a flow chart of a retro-directive method for transmitting signals back towards source 150 (FIG. 1) in a substantially synchronous manner and in a substantially precise angular direction, according to still another embodiment of the present invention. According to this embodiment, a set of antennas, such as antennas 105', 105" and 105''' (FIG. 3A), is connected to corner reflector 106' (FIG. 3A). According to an embodiment of the present invention, the antennas can be positioned on one or more intersecting flat surfaces of the corner reflector, and the antennas can be distanced one from another at the distance of, for example, a half wavelength of the highest radio frequency to be used for the signal transmission. Further, each antenna is connected to its corresponding communication units 110 (FIG. 1).

At step 370, the RF signal from transmitting source 150 hits a corner reflector 106', and then it is received by a set of antennas 105', 105", 105'''. Then, at step 375, the signal is sampled by means of A/D unit 117 (FIG. 1) provided within communication unit 110 of each antenna within said set. After this, at step 380, each signal sample is stored within corresponding DRFM units 125 (FIG. 1) of each antenna. At step 385, a new RF signal is reconstructed from said data samples, which are used as carriers for the data to be transmitted, giving rise to a reconstructed digital RF signal. Then, at step 390, said reconstructed digital RF signal is converted by means of D/A unit 119 (FIG. 1) into a reconstructed analog RF signal, which is (at step 395) transmitted by means of transmitter 116 (FIG. 1) of each antenna within set of antennas, and when the reconstructed RF signal hits corner reflector 106', it is reflected back towards source 150. When reflected by the corner reflector, the transmitted RF signal goes in substantially precise angular direction back towards source 150. In addition, it should be noted that according to this embodiment of the present invention, modulation of the transmitted signal $\phi_{T,n}(t)$ remains the same as the modulation of the received signal $\phi_{R,n}(t)$.

Figures 5A, 5B:
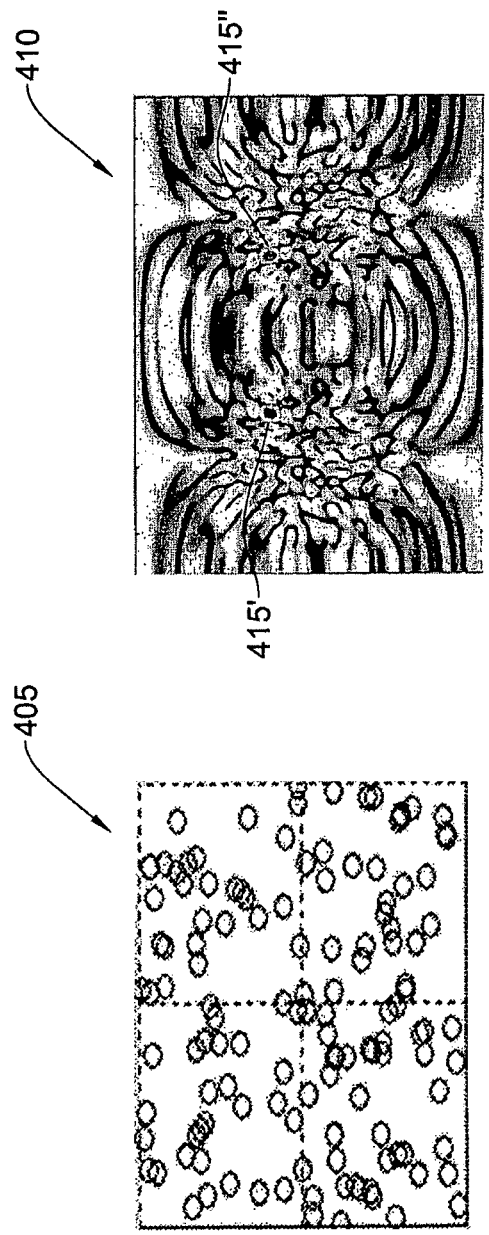

FIGS. 5A and 5C are sample illustrations of (random) locations of a plurality of antennas 405, 406, and FIGS. 5B and 5D are constructive interference maps 410, 411 of signals transmitted from said plurality of antennas, respectively, according to an embodiment of the present invention. Illustrations 405 and 406 present a plurality of randomly positioned antennas, wherein each antenna is represented by a circle. Illustration 410 presents a constructive interference map of signals transmitted from said plurality of antennas 405 back towards transmitting source 150 (FIG. 1), which is represented by point 415' (or 415") on the graph. It should be noted that at point 415' (or 415"), the greatest ERP (Effective Radiated Power) from the plurality of antennas 405 is received (the greater the ERP, the darker its grayscale representation on interference maps 410 and 411). According to an embodiment of the present invention, the signals are transmitted towards source 415' (or 415") from the plurality of antennas 405 without measuring an angular direction of said source and without calculating the phase differences of the signal transmitted from each antenna. As a result, there is also no need in positioning the plurality of antennas 405 on a straight plane because there is no need in determining the above signal phase differences.

Further, illustration 411 is a constructive interference map of signals transmitted from a plurality of antennas 406 back towards two transmitting sources, the first source represented by points 416' (or 416") and the second source represented by curve 420. This illustration 411 relates to communication with two or more transmitting sources. Similarly to illustration 410, there is no need in measuring an angular direction of said sources, and there is no need in calculating the phase differences of the RF signal to be transmitted from each antenna. Further, it is not necessary to position a plurality of antennas 406 on a straight plane.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system configured to transmit a signal back towards a transmitting source, the system comprising:
   a) at least two antennas being mutually synchronized for enabling to transmit the signal back towards a transmitting source in a substantially precise angular direction; and
   b) at least two communication units, each of which is connected to its corresponding antenna, said each communication unit comprising:
      b.1. a receiver for receiving a wideband signal from a transmitting source;
      b.2. an Analog-to-Digital (A/D) unit for sampling the received wideband signal for a predefined period of time, giving rise to signal samples, each of which has an amplitude and phase;
      b.3. a digital memory unit for storing the signal samples of said received wideband signal in its memory in a given sampling order, on a time scale;
      b.4. a processing unit for reconstructing a wideband signal, including:
         b.4.1. deciding about at least one sub-group of signal samples that are sampled within said predefined period of time;
         b.4.2 performing spectral decomposition of signal samples, obtaining to a set of frequency components;
         b.4.3 performing wideband phase conjugation to each of said frequency components of the wideband signal within said at least one sub-group, giving rise to phase conjugated signal samples; and
         b.4.4. reconstructing said wideband signal by using said phase conjugated signal samples as data carriers, giving rise to a reconstructed digital signal;

b.5. a Digital-to-Analog (D/A) unit for converting said reconstructed digital signal to a reconstructed analog signal to be transmitted; and b.6. a transmitter for transmitting said reconstructed analog signal back towards said transmitting source substantially simultaneously from said at least two antennas;

each signal sampling of each communication unit being performed substantially synchronously with respect to at least one other communication unit.

2. The system according to claim 1, wherein the signal is one or more of the following:
   a) a Radio Frequency (RF) signal;
   b) an electromagnetic (EM) signal;
   c) an acoustic signal;
   d) a seismic signal; and
   e) a photonic signal.

3. The system according to claim 1, wherein the digital memory unit is a Digital Radio Frequency Memory (DRFM) unit.

4. The system according to claim 1, wherein the reconstructed digital signal is transmitted with a delay.

5. The system according to claim 1, wherein the processing unit is incorporated within the transmitter.

6. The system according to claim 1, wherein the wideband phase conjugation of the signal samples is performed by multiplying said signal samples by a corresponding function.

7. The system according to claim 1, wherein the phase conjugation of the signal samples is performed by applying Fast Fourier Transform (FFT) on said wide signal samples.

8. The system according to claim 1, wherein reconstructing said signal includes modulating said signal utilizing each of said frequency components of said set, respectively by means of a modulation unit.

9. The system according to claim 1, wherein the reconstructed analog signal is transmitted back towards the transmitting source from each of the at least two antennas irrespective of the location of one antenna with respect to another.

10. The system according to claim 1, wherein the reconstructed analog signal is transmitted back towards the transmitting source from each of the at least two antennas, giving rise to reconstructed analog signals, without calculating phase differences between said reconstructed analog signals.

11. The system according to claim 1, wherein two or more transmitting sources are provided, each transmitting at least one signal and receiving back a corresponding reconstructed signal.

12. A method of transmitting a signal back towards a transmitting source, the method comprising:
   a) receiving a wideband signal from a transmitting source from at least two antennas being mutually synchronized;
   b) sampling the received wideband signal from each antennas for a predefined period of time, giving rise to signal samples substantially synchronously;
   c) storing the signal samples in a given sampling order, at the time scale;
   d) reconstructing a wideband signal, including:
      d.1. deciding about at least one sub-group of signal samples that are sampled within said predefined period of time;
      d.2. performing spectral decomposition of signal samples, obtaining a set of frequency components
      d.3. performing wideband phase conjugation to each of said frequency components of signal samples within said at least one sub-group, giving rise to phase conjugated signal samples; and
      d.4. reconstructing said wideband signal by using said signal samples, which have been phase conjugated, as data carriers, giving rise to a reconstructed digital wideband signal;
   e) converting said reconstructed digital wideband signal to a reconstructed analog wideband signal; and
   transmitting said reconstructed analog wideband signal back towards said transmitting source substantially simultaneously from said at least two antennas in a substantially precise angular direction.

13. The method according to claim 12, further comprising providing the signal as one or more of the following:
   a) a Radio Frequency (RF) signal;
   b) an electromagnetic (EM) signal;
   c) an acoustic signal;
   d) a seismic signal; and
   e) a photonic signal.

14. The method according to claim 12, further comprising performing the wideband phase conjugation of the signal samples by multiplying said signal samples by a corresponding function.

15. The method according to claim 12, further comprising performing the wideband phase conjugation of the signal samples by applying Fast Fourier Transform (FFT) on said signal samples.

16. The method according to claim 12, further comprising receiving the signal substantially simultaneously by means of at least two antennas.

17. The method according to claim 12, further comprising transmitting the reconstructed digital signal with a delay.

18. The method according to claim 17, further comprising transmitting the reconstructed analog signal back towards the transmitting source, substantially simultaneously by means of the at least two antennas.

19. The method according to claim 12, further comprising transmitting the reconstructed analog signal back towards the transmitting source from each of the at least two antennas irrespective of the location of one antenna with respect to another.

20. The method according to claim 12, further comprising transmitting the reconstructed analog signal back towards the transmitting source from each of the at least two antennas, giving rise to reconstructed analog signals, without calculating phase differences between said reconstructed analog signals.

21. The method according to claim 12, further comprising communicating with two or more transmitting sources, each transmitting source transmitting at least one signal and receiving back a corresponding reconstructed signal.

22. The method according to claim 12, wherein reconstructing said signal includes modulating said signal utilizing each of said frequency components of said set, respectively.

* * * * *